Aug. 14, 1928.
A. N. CRAMER
1,680,283
APPARATUS FOR SETTING UP AND TRANSFERRING BOTTLES AND OTHER ARTICLES
Filed March 31, 1924
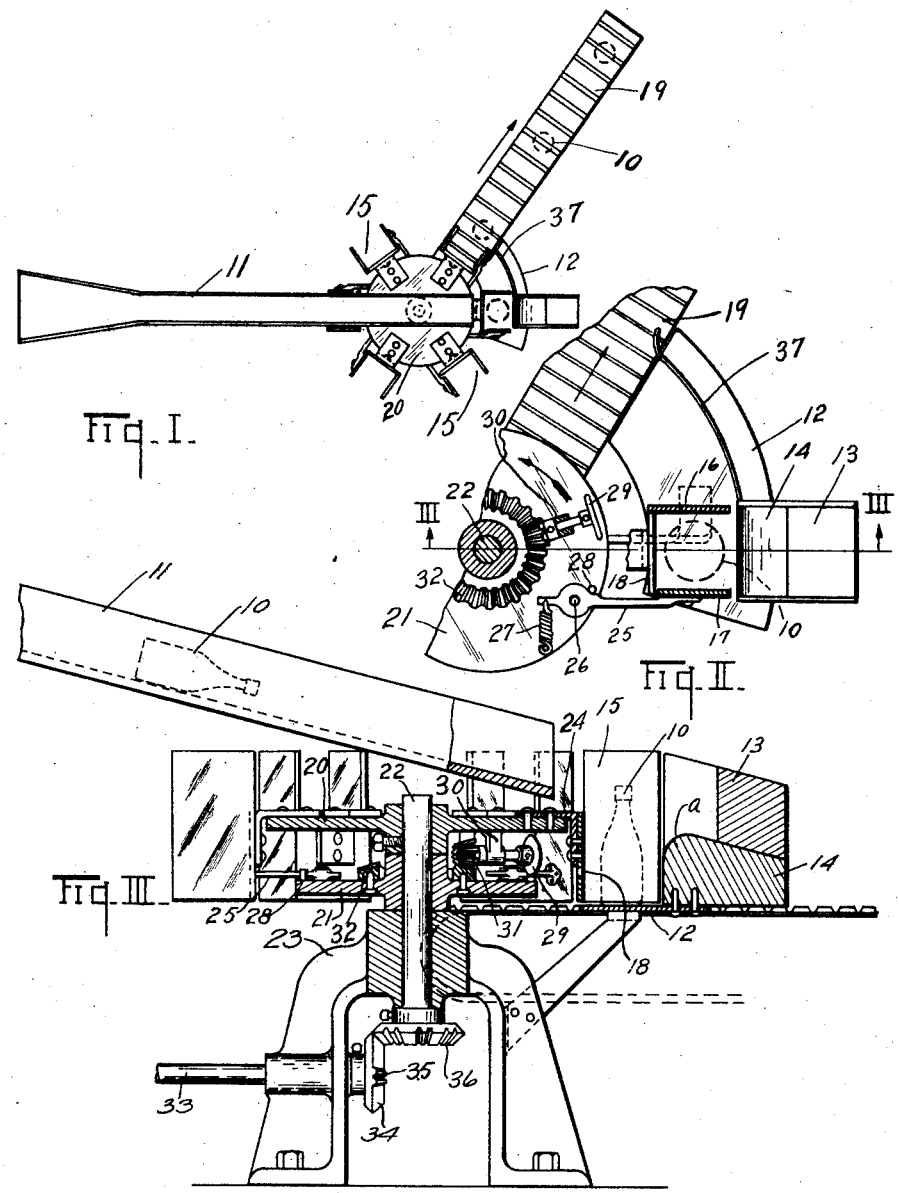

Patented Aug. 14, 1928.

1,680,283

UNITED STATES PATENT OFFICE.

ALBERT N. CRAMER, OF TOLEDO, OHIO, ASSIGNOR TO THE OWENS BOTTLE COMPANY, OF TOLEDO, OHIO, A CORPORATION OF OHIO.

APPARATUS FOR SETTING UP AND TRANSFERRING BOTTLES AND OTHER ARTICLES.

Application filed March 31, 1924. Serial No. 703,019.

My invention relates to apparatus adapted for receiving bottles or other glass articles as they are delivered from a forming machine, and delivering them in an upright position to a conveyor, by which they may be carried to an annealing leer.

An object of the invention is to provide an improved form of apparatus capable of handling the bottles or other articles when they are delivered in rapid succession from the forming machine.

Other objects of the invention will appear hereinafter. Although, as herein set forth, the invention is particularly designed for handling glass articles in the manner above indicated, it will be understood that the invention is not limited to such use and may be adapted to other purposes.

In the accompanying drawings:

Figure 1 is a plan view of an apparatus constructed in accordance with my invention.

Figure 2 is a part sectional plan view of the apparatus on a larger scale, parts being broken away.

Figure 3 is a part sectional elevation at the plane of the line III—III on Figure 2.

The bottles 10 or other glass articles are dropped from the glass forming machine onto a chute 11 and slide down the chute, neck end first, by gravity. At the lower end of the chute there is provided means for setting the articles in upright position on a stationary plate 12. Such means includes a stop or bumper 13, which may be made of wood or other suitable material, against which the neck end of the bottle strikes as it jumps off the chute. The bottle then falls back and takes an upright position on the plate 12. The bottle is guided in its movement to upright position by the curved surface $a$ of a block 14 which engages the bottle forward of its center of gravity.

Each bottle as it is placed in upright position is received in a transfer pocket or carrier 15 comprising vertical side plates 16 and 17 and a back plate 18. The bottle is transferred by the carrier 15 to a continuously traveling endless belt conveyor 19 which may carry it to the annealing leer. A plurality of carriers 15 are provided and are supported on an intermittently rotating carriage comprising upper and lower disks 20 and 21 connected to a drive shaft 22 rotatably mounted in a stationary frame 23.

The plates 16 of the carriers are formed integral with the back plates 18, the latter being rigidly connected to the disk 20 by brackets 24. The plates 17 are carried on arms 25, each having a pivotal connection 26 with the lower disk 21. The arm is held by a spring 27 against a stop 28. This construction provides a safety device permitting the plate 17 to yield if a bottle is caught, thereby permitting the apparatus to continue its operation without interruption.

The lower disk 21 of the carriage is rotatably adjustable relative to the upper disk for the purpose of adjusting the plates 17 toward or from the plates 16 for holding bottles or articles of different sizes. This adjustment may be effected by a hand wheel 29 attached to a shaft journalled in a bracket 30 on the disk 20, said shaft carrying a pinion 31 in mesh with a ring gear 32 on the disk 21. By rotating the hand wheel, the disk 21 is rotated on the shaft 22, thus moving the plates or walls 17 toward or from the walls 16.

A step-by-step rotation is imparted to the carriage by means of a continuously rotating drive shaft 33 carrying a mutilated gear 34 which may have a single set of gear teeth 35. A mutilated gear 36 on the shaft 22 is provided with sets or groups of gear teeth corresponding in number to the number of pockets 15 on the carrier, so that each complete rotation of the shaft 33 will advance the carriage through an angle equal to the angular distance between the centers of each two adjacent pockets 15. The drive shaft 33 is preferably geared to the machine which delivers the bottles to the chute 11, so that the movements of the carriage are synchronized and timed to correspond with the delivery of the bottles. The conveyor 19 is so located that each step movement of the carriage advances a pocket 15 from its receiving position (Fig. 2) to a position directly over the conveyor 19, so that the article in said pocket is placed on the conveyor. The plate 17 acts as a pusher to push the bottle forward on to the conveyor. A stationary guide plate 37 is located over the bottom plate 12 in position to close the front side of the carrier 15 during the transfer of the bottle to the conveyor 19, thus forming a four sided pocket which positively prevents the bottle from tipping over during the transfer to the conveyor. The bottle is carried forward with the conveyor, in upright position and clears the pocket before the next step movement of the carriage.

It will be observed that with the construction herein shown, the bottles or other articles are very quickly transferred from the chute to an upright position on the supporting plate 12. From this position they can be quickly transferred to the conveyor 19 and placed thereon without liability of toppling over. The apparatus is thus designed to receive and transfer the bottles to the belt conveyor in rapid succession, adapting such apparatus for use with high speed glass forming machines.

Modifications may be resorted to within the spirit and scope of my invention.

What I claim is:

1. Article transferring mechanism comprising, in combination, a series of article carriers each comprising side walls, means to move the carriers successively to and from an article receiving station, means individual to each carrier for yieldably holding one of said walls in normal article holding position, a chute down which articles slide by gravity in a cumbent position, means adjacent the lower end of the chute to deliver articles directly from the chute to said carriers in an upright position at said receiving station, said carriers causing the articles to be moved to a discharge station, and automatic means for conveying articles away from the carriers.

2. The combination of a horizontally disposed annular series of carriers each comprising side walls, means to rotate said series about a vertical axis and thereby bring the carriers successively to an article receiving position, means individual to each carrier for yieldably holding one of said walls in normal article holding position, an inclined chute down which articles slide in a cumbent position, means adjacent the article receiving position and discharge end of the chute to set an article in an upright position in a carrier, and automatic means for causing the discharge of the articles from the carriers at a predetermined discharging station.

3. The combination of a carriage, means to rotate it about a vertical axis, an annular series of transfer devices connected to the carriage to rotate therewith, each device comprising side walls, an inclined chute down which articles slide in a cumbent position, means adjacent the article receiving position and discharge end of the chute to set an article in an upright position in a transfer device, means individual to each device for yieldably holding one of said walls in article holding position, and a conveyor positioned to receive the articles at a predetermined discharge station and convey them away from the transfer devices.

4. The combination of a stationary platform, an inclined chute down which articles slide by gravity in a cumbent position, means on said platform adjacent the discharge end of the chute for setting the articles one by one in an upright position on said platform, a horizontally traveling conveyor, transfer devices, and means to bring said transfer devices successively into operation to receive the articles directly from the chute and shift them from the platform onto the conveyor.

5. The combination of a stationary platform, an inclined chute down which articles slide by gravity in a cumbent position, means on said platform adjacent the discharge end of the chute to direct the articles one by one from said chute to an upright position on the platform, a horizontally traveling conveyor, transfer devices, and means to bring said transfer devices successively into operation to engage said articles and shift them from the platform onto the conveyor, said transfer devices being arranged to travel in a closed path horizontally over said platform.

6. The combination of a stationary article receiving platform, an inclined chute having its discharge end terminating at one side of the platform and adapted to guide the articles to said platform, means aligned with the chute and arranged at the opposite side of the platform to set articles upright on the platform as they are discharged from the chute, means to move the articles along the platform, said means comprising an annular series of transfer devices rotating about a vertical axis, and means to periodically stop movement of the transfer devices permitting delivery of an article directly from the chute to a transfer device.

7. The combination of an article-receiving platform, an inclined chute down which articles slide by gravity in a cumbent position, a continuously traveling conveyor located at one side of the platform, means at the discharge end of the chute to turn said articles as they are delivered from said chute, to an upright position on the platform, and means to transfer the articles from the platform onto the conveyor, said transfer means comprising a horizontally rotating carriage and a plurality of transfer devices rotating with the carriage and brought successively into position to receive an article directly from the chute as the article is delivered to the platform, said devices operable to transfer the article to said conveyor.

8. The combination of an article-receiving platform, an inclined chute down which articles slide by gravity in a cumbent position, a continuously traveling conveyor located at one side of the platform, means at the discharge end of the chute to engage said articles as they are delivered from said chute and place them in upright position on the platform, and means to transfer the articles from the platform onto the conveyor, said transfer means comprising a horizontally rotating carriage and a plurality of transfer devices rotating with the carriage, said transfer devices each comprising spaced vertical walls forming a pocket to receive an article directly from the chute, as the article is delivered to the platform, said pockets operable to transfer the article from the platform to said conveyor.

9. The combination of a platform, an inclined chute down which articles slide by gravity in a cumbent position, means at the discharge end of the chute to deliver articles seriatim from the said chute to the platform and set them in upright position thereon, a carriage, means to rotate it step by step about a vertical axis, and transfer devices brought successively to article engaging position over the platform by said rotation of the carriage and operable to move said articles away from said platform.

10. The combination of a platform, an inclined chute, means at the discharge end of the chute to deliver articles seriatim sliding thereon endwise by gravity to the platform and set them in upright position thereon, a carriage, means to rotate it step by step about a vertical axis, transfer devices brought successively to article-engaging position over the platform by said rotation of the carriage to receive articles directly from the chute and operable to move said articles away from said platform, and a horizontally traveling conveyor beneath the path of the transfer devices to receive said articles.

11. The combination of a stationary article receiving platform, an inclined chute having its discharge end terminating at one side of the platform and adapted to guide the articles to said platform, means aligned with the chute and arranged at the opposite side of the platform to set articles upright on the platform as they are discharged from the chute, means to move the articles along the platform, said last mentioned means comprising an annular series of transfer devices rotating about a vertical axis, means to periodically stop movement of the transfer devices permitting delivery of an article directly from the chute to a transfer device, and a continuously traveling conveyor arranged to remove articles from the platform and transfer devices at a predetermined station during the periods of delivery of articles to the transfer devices.

12. The combination of an inclined chute down which articles slide by gravity, a carriage, means to rotate it step by step about a vertical axis, an annular series of transfer devices connected to rotate with the carriage, said transfer devices each comprising a pair of vertical spaced plates between which an article may be received, said transfer devices being brought successively by the rotation of the carriage to an article-receiving station below the lower end of said chute, automatic means adjacent the lower end of the chute to deliver articles at said station in upright position between said plates, whereby the articles are conveyed by said plates away from said receiving position, and a horizontally traveling conveyor beneath the path of the transfer devices to receive said articles, said conveyor moving in a direction to carry the articles away from between said plates.

13. The combination of an inclined chute down which articles move by gravity in a cumbent position, a platform adjacent the discharge end of the chute, means at the lower end of the chute to direct the articles to and set them in an upright position on the platform as they leave the chute, a carriage rotatable about a vertical axis, and transfer devices on the carriage each comprising a pair of spaced plates brought by the rotation of the carriage to a position over the platform to receive articles directly from the chute as they are set upright on said platform, said transfer devices operable to carry said articles in an upright position off said platform.

14. The combination of a chute down which articles move by gravity, a platform adjacent the discharge end of the chute, means to direct the articles to an upright position on the platform as they leave the chute, a pair of spaced disks comprising a carriage rotatable about a vertical axis, transfer devices on the carriage each comprising a pair of spaced plates brought by the rotation of the carriage to a position over the platform to receive articles as they are placed on said platform, said transfer devices operable to carry said articles in an upright position off said platform, differential gear connections between said disks, and means for actuating the said connections for adjusting the disks relatively to one another.

15. The combination of an inclined chute down which articles move by gravity in a cumbent position, a platform adjacent the discharge end of the chute, means at the lower end of the chute to direct the articles to and set them in an upright position on the platform as they leave the chute, a carriage rotatable about a vertical axis, and transfer devices on the carriage each comprising a pair of spaced plates brought by the rotation of the carriage to a position over the platform to receive articles directly from the chute as they are set upright on said platform, said transfer devices operable to carry said articles in an upright position off said platform, said carriage comprising members relatively adjustable rotatively about the axis of the carriage, one plate of each of said transfer devices being connected to one of said members and the other plate to the other of said members, differential gear connections between said members, and means for actuating the said connections for adjusting the plates relatively to each other.

16. The combination of an inclined chute down which articles move by gravity in a cumbent position, a platform adjacent and below the discharge end of the chute, means on the side of the platform opposite the chute to direct the articles to and set them in an upright position on the platform as they leave the chute, a carriage rotatable about a vertical axis, transfer devices on the carriage each comprising a pair of spaced plates brought by the rotation of the carriage to a position over the platform to receive articles directly from the chute as they are set upright on said platform, said transfer devices operable to carry said articles in an upright position off said platform, said carriage comprising upper and lower disks, one plate of each transfer device being connected to the upper disk and the other plate to the lower disk, differential gear connections between said disks, and manual means for effecting relative rotation of the disks and thereby simultaneously adjusting the width of all of said transfer devices.

Signed at Toledo, in the county of Lucas and State of Ohio, this 26th day of March, 1924.

ALBERT N. CRAMER.